US008955044B2

(12) United States Patent
Punera et al.

(10) Patent No.: US 8,955,044 B2
(45) Date of Patent: Feb. 10, 2015

(54) TIME MANAGED CHALLENGE-RESPONSE TEST

(75) Inventors: Kunal Punera, San Francisco, CA (US);
Shanmugasundaram Ravikumar, Berkeley, CA (US); Anirban Dasgupta, Berkeley, CA (US); Belle Tseng, Cupertino, CA (US); Hung-Kuo (James) Chu, Tainan (TW)

(73) Assignee: Yahoo! Inc., Sunnyvale, CA (US)

( * ) Notice: Subject to any disclaimer, the term of this patent is extended or adjusted under 35 U.S.C. 154(b) by 866 days.

(21) Appl. No.: 12/897,615

(22) Filed: Oct. 4, 2010

(65) Prior Publication Data
US 2012/0084832 A1 Apr. 5, 2012

(51) Int. Cl.
*G06F 21/00* (2013.01)
*H04L 9/32* (2006.01)

(52) U.S. Cl.
CPC ................... *H04L 9/3271* (2013.01)
USPC ........ 726/2; 726/26; 726/27; 726/28; 726/29; 726/30; 713/168; 713/169; 713/170; 713/171; 713/172; 713/173; 713/174; 713/182; 713/183; 713/184; 713/185; 713/186; 709/225; 709/229

(58) Field of Classification Search
USPC .................. 713/168–174, 182–186; 726/2–8, 726/26–30; 709/225, 229
See application file for complete search history.

(56) References Cited

U.S. PATENT DOCUMENTS

| | | | | |
|---|---|---|---|---|
| 6,728,883 | B1* | 4/2004 | Kohashi et al. | 726/26 |
| 7,891,005 | B1* | 2/2011 | Baluja et al. | 726/26 |
| 8,621,396 | B1* | 12/2013 | Gossweiler, III | 715/863 |
| 2008/0216163 | A1* | 9/2008 | Pratte et al. | 726/7 |
| 2011/0283346 | A1* | 11/2011 | Li et al. | 726/7 |
| 2011/0292031 | A1* | 12/2011 | Zhu et al. | 345/419 |
| 2013/0326380 | A1* | 12/2013 | Lai et al. | 715/765 |

OTHER PUBLICATIONS

Gossweiler et al., NPL document "What's up Captcha ? A captcha based on image orientation", Apr. 20, 2009, Madrid.*
S. King, "*Motion Enabled Multi-Frame Challenge-Response Test*", U.S. Appl. No. 12/695,098, filed Jan. 27, 2010.
S. King, "*Multi-Step Challenge-Response Test*", U.S. Appl. No. 12/873,140, filed Aug. 31, 2010.
Captcha, Wikipedia, the free encyclopedia, Nov. 9, 2009, pp. 1-8, http://en.wikipedia.org/wiki/Captcha.

* cited by examiner

*Primary Examiner* — Josnel Jeudy
(74) *Attorney, Agent, or Firm* — Martine Penilla Group, LLP

(57) ABSTRACT

A method of generating a time managed challenge-response test is presented. The method identifies a geometric shape having a volume and generates an entry object of the time managed challenge-response test. The entry object is overlaid onto the geometric shape, such that the entry object is distributed over a surface of the geometric shape, and a portion of the entry object is hidden at any point in time. The geometric shape is rotated, which reveals the portion of the entry object that is hidden. A display region on a display is identified for rendering the geometric shape and the geometric shape is presented in the display region of the display.

19 Claims, 17 Drawing Sheets

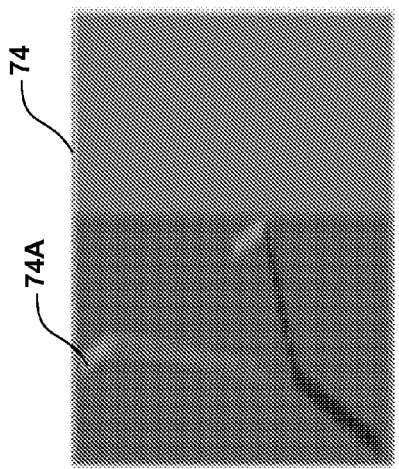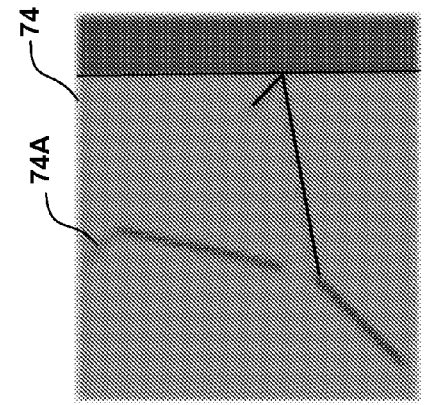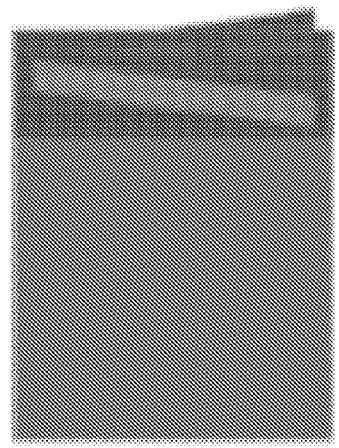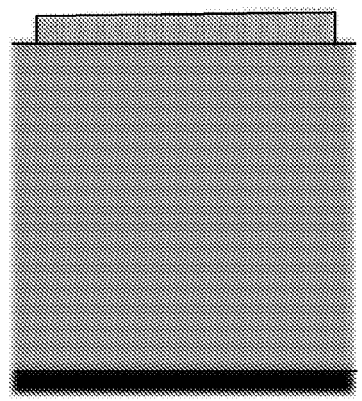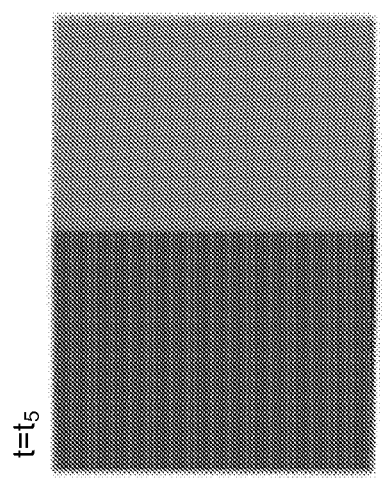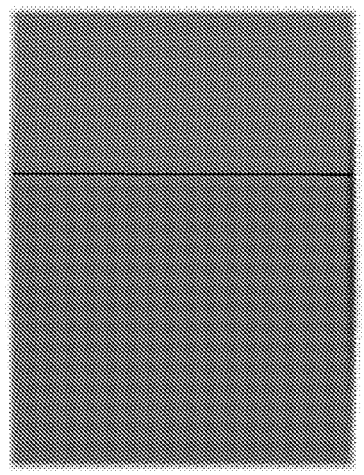
Fig. 3E   Fig. 3F

TIME MANAGED CHALLENGE-RESPONSE TEST

BACKGROUND

CAPTCHAs (Completely Automated Public Turing test to tell Computers and Humans Apart) are often used to ensure that information submitted to a computer system was submitted by a legitimate user rather than an automated system. A CAPTCHA is a type of challenge-response test used to ensure that an account request is not generated by an automated system, where the most common type of CAPTCHA requires the user to alphanumeric characters rendered as a distorted image that appears on a display screen. Assuming automated systems are unable to solve the CAPTCHA, any user entering a correct solution is presumed to be a legitimate user.

In response to recent CAPTCHAs designs that more difficult for an automated system to solve, malicious users have turned to human-computation attacks utilizing "human CAPTCHA farms". These "human CAPTCHA farms" are employed to solve the CAPTCHAs displayed on a webpage, while the automated system automatically fills in and submits the rest of the webpage. The economic model behind the use of the "human CAPTCHA farm" is to use a large number of low skilled workers to quickly solve separated CAPTCHAs that are in a queue. The incentive for using these "human CAPTCHA farms" can be reduced by disrupting the economic model that makes their use attractive. One approach is to reduce the throughput of these "farms" so that the economics behind the "human CAPTCHA farm" can be shifted to the point where it is no longer worth the time or money to solve CAPTCHAs.

It is in this context that embodiments of the invention arise.

SUMMARY

Broadly speaking, the present invention fills these needs by providing a method and apparatus for imposing a time constraint on a user to reduce efficiency of solving challenge-response tests. In one embodiment, a time managed challenge-response test is structured to require at least a specified amount of time before the challenge-response test can be solved. It should be appreciated that the present invention can be implemented in numerous ways, including as a method, a system, or a device. Several inventive embodiments of the present invention are described below.

In accordance with one aspect of the invention, a method of generating a time managed challenge-response test is detailed. The method identifies a geometric shape having a volume and generates an entry object of the time managed challenge-response test. The entry object is overlaid onto the geometric shape, such that the entry object is distributed over a surface of the geometric shape, and a portion of the entry object is hidden at any point in time. The geometric shape is rotated, which reveals the portion of the entry object that is hidden. A display region on a display is identified for rendering the geometric shape and the geometric shape is presented in the display region of the display.

In accordance with another aspect of the invention, a computing system for authenticating access using a time managed challenge-response test is provided. The computing system has a processor that includes a test generation engine for generating the entry object of the time managed challenge-response test. In addition, a graphics engine identifies a geometric shape having a volume, and the entry object is overlaid onto the surface of the geometric shape by an overlay engine. Overlaying the entry object by the overlay engine distributes the entry object over the surface of the geometric shape, such that a portion of the entry object is hidden at any point in time. The geometric shape is rotated by a movement engine, where the rotation of the geometric shape reveals the portion of the entry object that is hidden. A display renderer engine renders the geometric shape that is overlaid with the entry object.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 3A-F illustrate a time managed challenge-response test implemented using multiple geometric shapes, in accordance with one embodiment of the present invention.

DETAILED DESCRIPTION

The following embodiments describe an apparatus and method for imposing a time constraint on a user to reduce efficiency of solving challenge-response tests. It will be obvious, however, to one skilled in the art, that the present invention may be practiced without some or all of these specific details. In other instances, well known process operations have not been described in detail in order not to unnecessarily obscure the present invention. Embodiments described below detail challenge-response tests in which an entry object is revealed over a period of time. Furthermore, the time period in which the entry object of the challenge-response test is revealed can be adjusted depending on the sensitivity of data or probability of automated abuse.

Figure 1A:
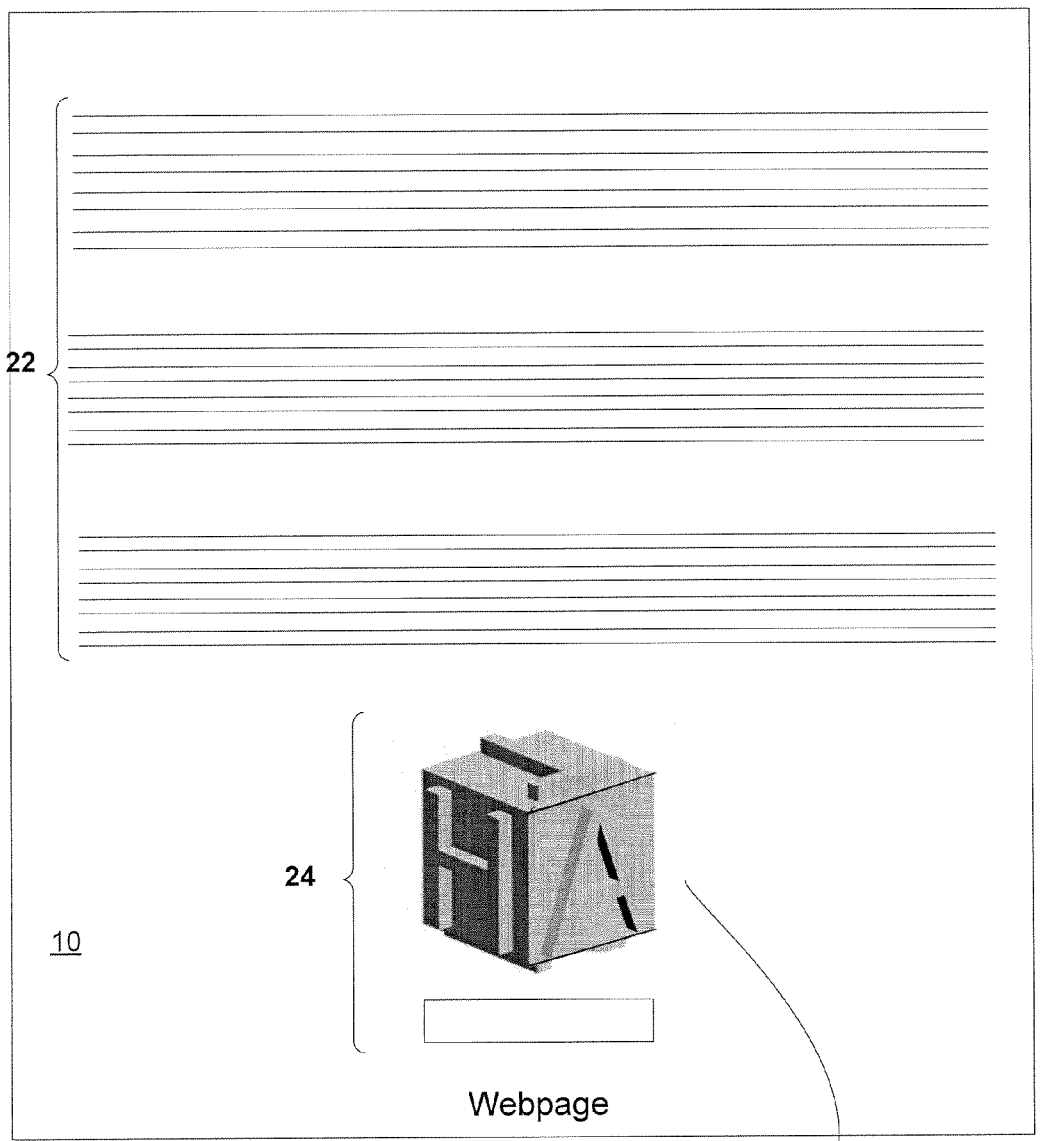
FIG. 1A illustrates a webpage utilizing a time managed challenge-response test, in accordance with one embodiment of the present invention.

FIG. 1A illustrates a webpage utilizing a time managed challenge-response test, in accordance with one embodiment of the present invention. Before an account is created to enable access to the Internet service of a web portal, such as e-mail, social networking, financial services, etc., the web portal will often require the user perform an authentication process. The Internet services are cited for illustrative purposes and as such are not limiting. Account creation procedures often require users to obtain an account through an authentication webpage 10. The authentication process may have the user provide user identification, as well as personal, information 22. In one embodiment, the user is required to solve a time managed challenge response test 24 where the entirety of the challenge-response test is rendered over a period of time in order to activate an account. In another embodiment, solving the time managed challenge-response test involves entering a sequence of alphanumeric characters of an entry object rendered on the display of the client system. Once the user has been determined to be a legitimate user, the web portal will create an account allowing the user to access the requested Internet service.

By monitoring the activity on the Internet service, some requested activity, e.g., sending a mass e-mail, may be flagged. For example, it may be determined that the Internet Protocol (IP) address of the client system requesting the activity originates from a geographic location known for fraudulent activity. Requested activity that is flagged can trigger a process requiring the user to further authenticate the requested activity is originating from legitimate user. In one embodiment, a monitoring process uses a time managed challenge-response test to further authenticate the user. One skilled in the art will appreciate the time managed challenge-response test is applicable to situations, such as account creation, where it is reasonable to impose a time constraint on the user so that extra time is required to solve the time managed challenge-response test.

Figure 1B:
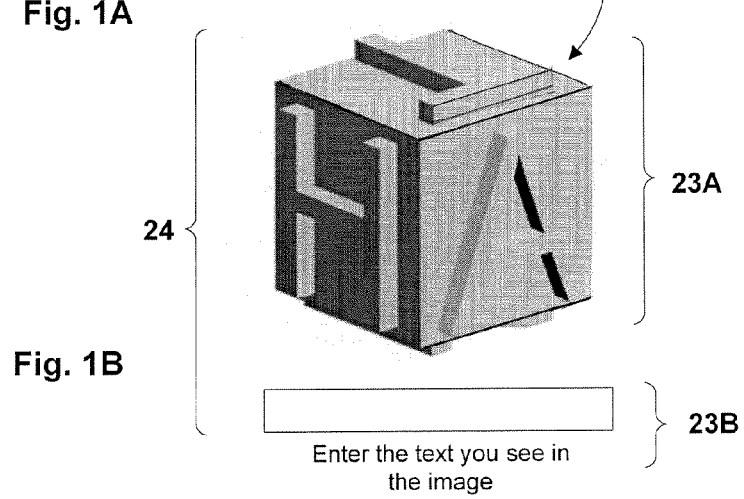
FIG. 1B illustrates the details of a time managed challenge-response test, in accordance with one embodiment of the present invention.

FIG. 1B illustrates the details of a time managed challenge-response test, in accordance with one embodiment of the present invention. A time managed challenge-response test 24 can have a display area 23A to render the challenge-response test 24, as well as a response area 23B for the user to type in the alphanumeric characters of the entry object rendered in the display area 23A. In one embodiment, the entire entry object of the challenge-response test 24 is revealed over a specified period of time. In another embodiment, the user inputs the solution of the time managed challenge-response test into the response area 23B after the entry object has been revealed to the user. In other words, while the user can input a solution to the time managed challenge-response test at any time, the entire sequence of alphanumeric characters of the entry object is fully revealed over the course of a specified period of time.

Figure 2:
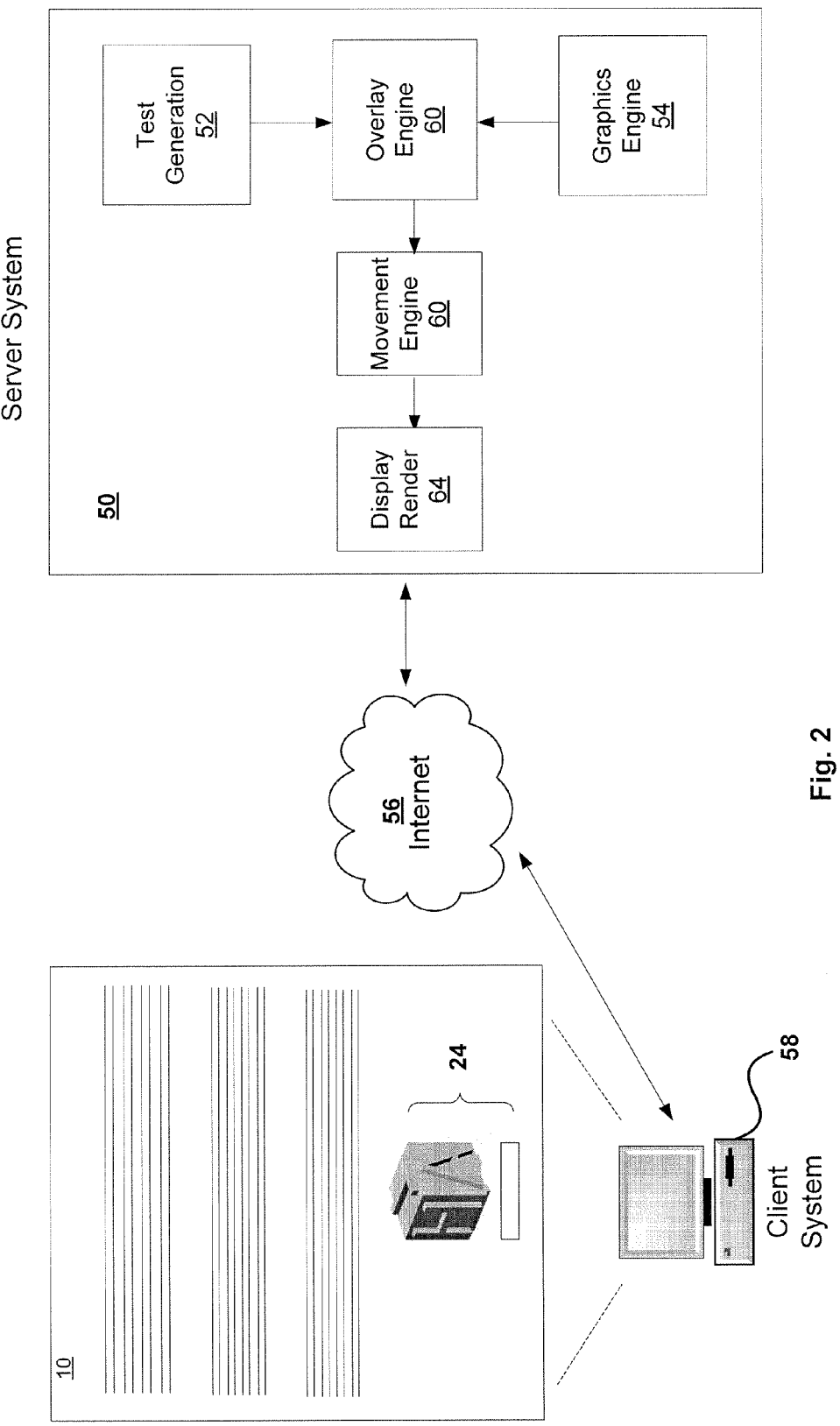
FIG. 2 illustrates a system implementing a time managed challenge-response test, in accordance with one embodiment of the present invention.

FIG. 2 illustrates a system implementing a time managed challenge-response test, in accordance with one embodiment of the present invention. As discussed above in reference to FIG. 1A, the user creates an account of an Internet service through an authentication webpage 10, which is displayed on the display of the client system 58. Data exchanged between the client system 58 and the server system 50 of the web portal through the Internet 56 allows the user to create an account and access Internet services of the web portal. In addition, the server system 50 performs authentication and monitoring processes to maintain the security of the web portal. As part of the authentication process, the server system 50 generates the time managed challenge-response test 24 that is rendered on a display of the client system 58 and evaluates the solution provided by the user. In one embodiment, the time managed challenge-response test 24 is generated and evaluated using method operations primarily executed by a processor of the server system 50.

The test generation engine 52 generates the entry object of the time managed challenge-response test 24. In other words, the test generation module 52 generates the alphanumeric sequence used to authenticate the user. The alphanumeric sequence should be broadly construed to include characters from either Latin and non-Latin scripts. The graphics engine 54 identifies a geometric shape having a volume, where the geometric shape should be broadly construed to include cubes, spheres, tetrahedrons, polygons, and generally any geometric shape, both regular and irregular, with a volume. The server system 50 further includes an overlay engine 60 that overlays the entry object generated by the test generation 52 onto the surface of the geometric shape identified by the graphics engine 54. In one embodiment, the overlay engine 60 embosses the entry object as a protrusion on the surface of the geometric shape.

The movement engine 62 of the server system 50 rotates the geometric shape from the overlay engine 60. One with skill in the art will appreciate that rotating the geometric shape reveals a portion of the entry object that was previously hidden to the user, while another portion of the entry object that was previously visible is then hidden. In one embodiment, either speed, direction, axis of rotation, or any combination of these characteristics associated with the geometric shape is randomly varied as a function of time. One with skill in the art will further appreciate that the variation in movement, determined by the movement engine 62, of the geometric shape reveals portions of the entry object of the time managed challenge-response test 24 in an intermittent fashion. The display renderer engine 64 of the server renders the time managed challenge-response test 24 on the display of the client system. In one embodiment, as the display renderer engine 64 renders the time managed challenge-response test 24, the test generation engine 52 requests user input for each revealed portion of the entry object and the requested user input is compared with the entry object.

In one embodiment, the graphics engine 54 of the server system 50 generates a pattern defined by graphical elements. Graphical elements of the pattern should be broadly construed to include lines, alpha-numeric characters, dots, symbols, random shapes, characters in non-Latin scripts, any combination of the above, etc. It should be appreciated that any graphical element is applicable, so long as the graphical element acts to obscure a portion of the entry object. The overlay engine 60 further overlays the geometric shape with the pattern defined by graphical elements onto the entry object identified by the test generation engine 52.

In a separate embodiment, the time managed challenge-response test renders the entire entry object in the display area of the client system 58 and relies on the pattern defined by graphical elements to obscure the entry object in a manner that the entire entry object is revealed over a specified period of time. As discussed above, the test generation engine 52 identifies an entry object of the time managed challenge-response test. The graphics engine 54 generates a pattern defined by graphical elements, where in one embodiment, the pattern defined by graphic elements also has an area free of graphical elements. In other words, the pattern defined by graphical elements has a clear area through which the user can discern features underneath the pattern defined by graphical elements.

The overlay engine 60 overlays the pattern generated by the graphics engine 54 over the entry object. The movement engine 62 moves the area of the pattern free of graphical elements along a path traversing across the entry object. The area of the pattern free from graphical elements over the entry object makes a portion of the entry object visible at a given time. One will skill in the art will appreciate that as the area of the pattern free of graphical elements moves along the path traversing across the entry object, a portion of the entry object that was obscured becomes visible and another portion that was visible becomes hidden. As discussed above, the display render 64 of the server system 50 identifies the display region on a display of the client system 58 for rendering the pattern defined by graphical elements and the entry object of the time managed challenge-response test.

FIGS. 3A-F illustrate a time managed challenge-response test implemented using multiple geometric shapes, in accordance with one embodiment of the present invention. The time managed challenge-response test 24 uses multiple geometric shapes 70-74, where the entry object 70-74A of the time managed challenge-response test 24 is distributed over the multiple geometric shapes 70-74. Distributed portions of the entry object 70-74A are overlaid on the geometric shapes 70-74. In one embodiment, each geometric shape 70-74 rotates about a fixed axis of rotation, such that a portion of the entry object 70-74A is visible at a given time, while the remaining portions of the entry object 70-74A are hidden from the user. In another embodiment, a speed of rotation is determined by the movement engine of the server system, as illustrated in FIG. 2. Still further, characters of the entry object 70-74A are formed as a protrusion on the surface of the geometric shapes 70-74, in one embodiment.

Figure 3A:
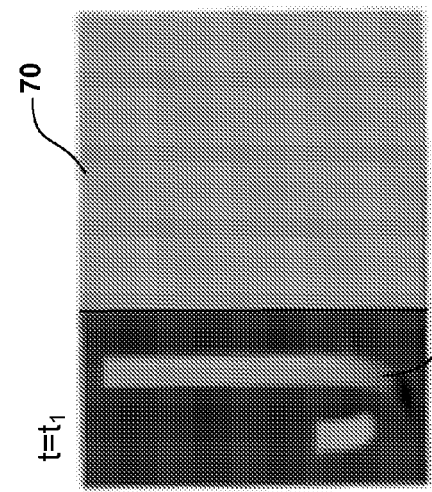
Figure 3A:
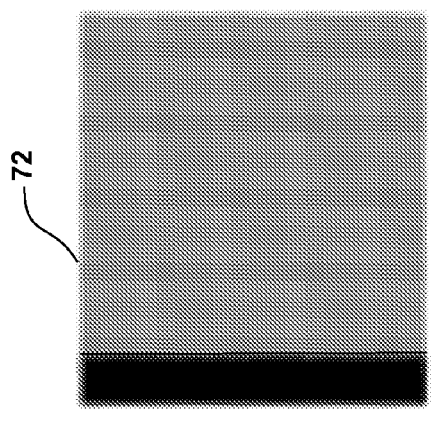
Figure 3A:
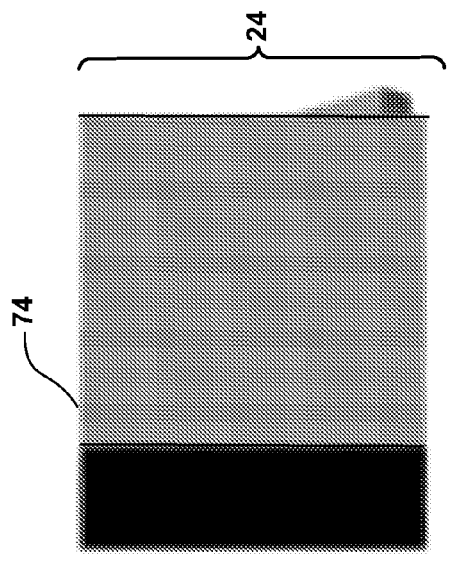
Figure 3B:
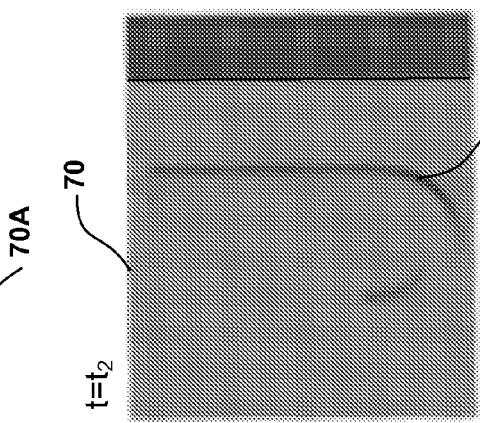
Figure 3B:
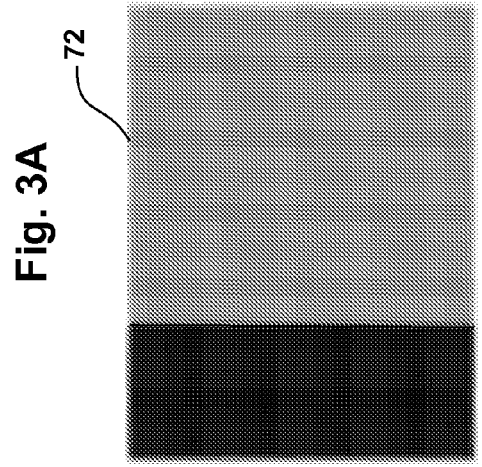
Figure 3B:
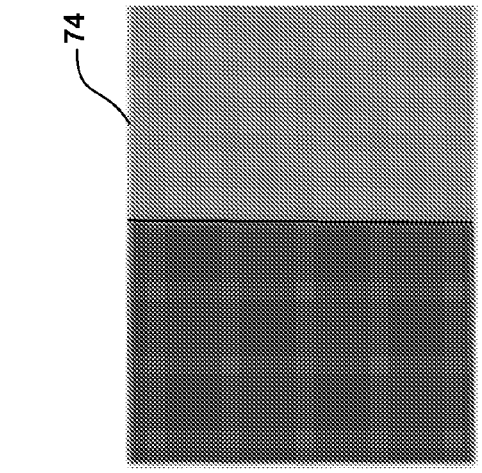
Figure 3C:
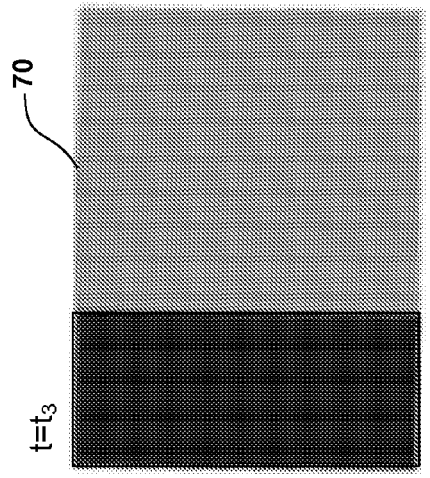
Figure 3C:
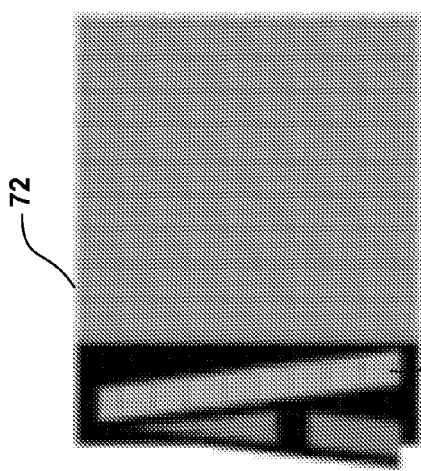
Figure 3C:
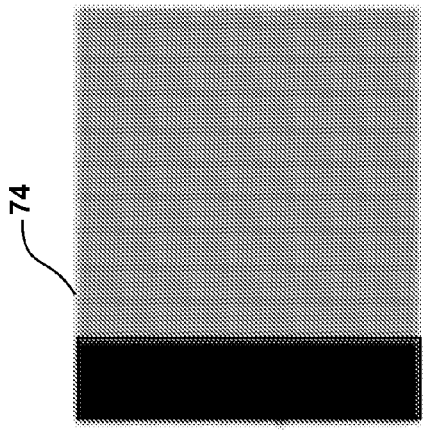
Figure 3D:
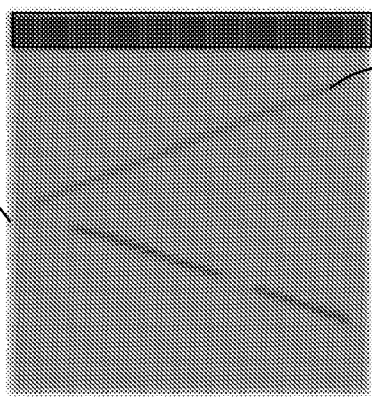
Figure 3D:
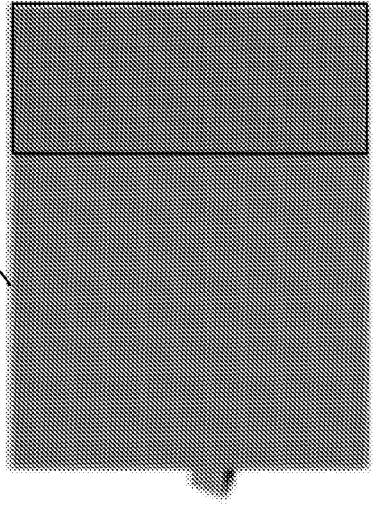

FIGS. 3A-B illustrate at times $t_1$ and $t_2$, the portion of the entry object 70A of the time managed challenge-response test associated geometric shape 70 is visible, while portions of the entry object associated with geometric shapes 72-74 are hidden. In one embodiment, the geometric shapes 70-74 are rotated such that portions of the entry object 70-74A associated with each geometric shape are visible at different points in time. One with skill in the art will appreciate that embossing the portion of the entry object 70A as a protrusion on the surface of the geometric shape 70 prevents the portion of the entry object 70A from being visible when viewed straight on. In other words, the portion of the entry object 70A associated with geometric shape 70 is discernable when viewed at an angle, but blends into the background when viewed straight on. At times $t_3$ and $t_4$, the portion of the entry object 70A associated with geometric shape 70 is hidden, while the portion of the entry object 72A associated with geometric shape 72 is visible, as illustrated in FIGS. 3C-D. Then at times $t_5$ and $t_6$, the portion of the entry object 74A associated with geometric shape 74 is visible after rotation of geometric shape 74, while the portions of the entry object associated with geometric shapes 70-72 are hidden, as illustrated in FIGS. 3E-F.

FIGS. 4A-H illustrate a time managed challenge-response test implemented using a rotating geometric shape, in accordance with one embodiment of the present invention. The time managed challenge-response test 24 has the entry object 70A-F distributed to different locations on the surface of the geometric shape 70, such that a different portion of the entry object 70A-F is visible at a given time. In one embodiment, the entry object 70A-F is overlaid and embossed on the surface of the geometric shape 70 as protrusion. In another embodiment, the entry object 70A-F is debossed on the surface of the geometric shape 70 as an indention. The entry object 70A-F associated with the geometric shape 70 is revealed to the user through rotation of the geometric shape 70, such that over a specified period of time the entire entry object 70A-F is revealed to the user. In another embodiment, the time managed challenge-response test operates in an "interaction mode", where the geometric shape 70 rotates to a new position when a portion of the entry object 70A-F is entered by the user.

Figure 4A:
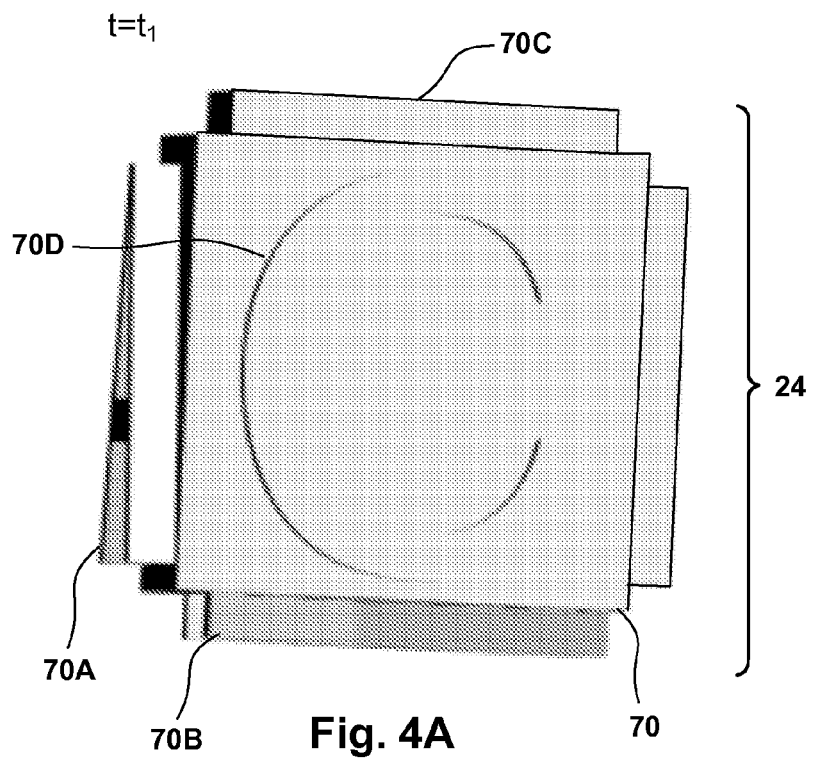
FIGS. 4A-H illustrate a time managed challenge-response test implemented using a rotating geometric shape, in accordance with one embodiment of the present invention.
Figure 4B:
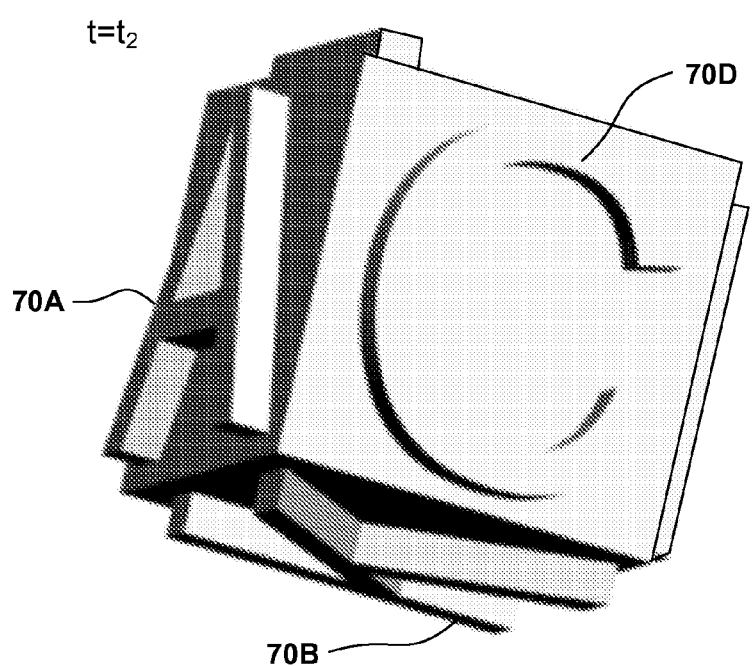
Figure 4C:
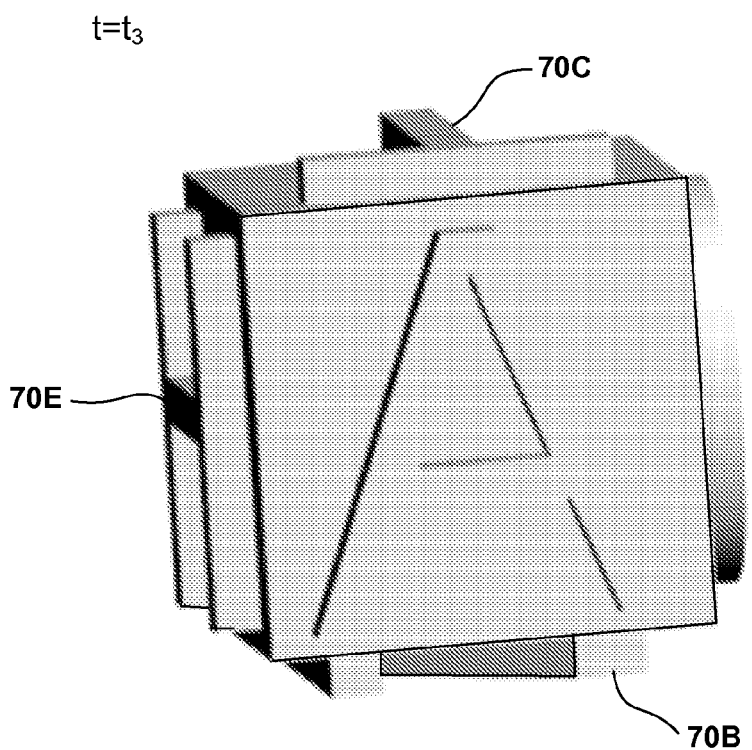
Figure 4D:
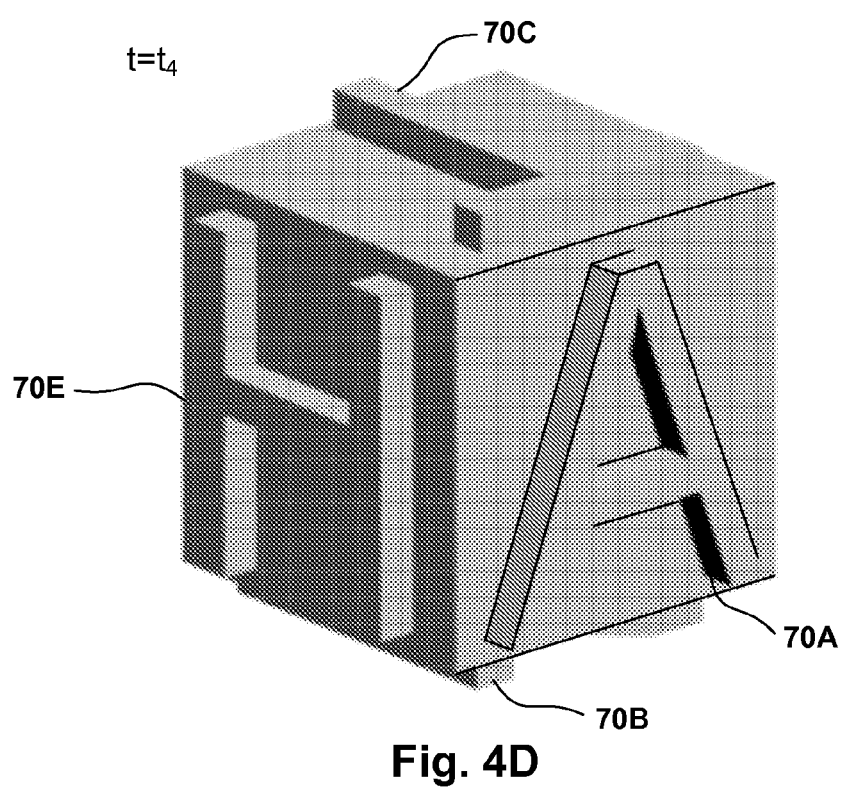
Figure 4E:
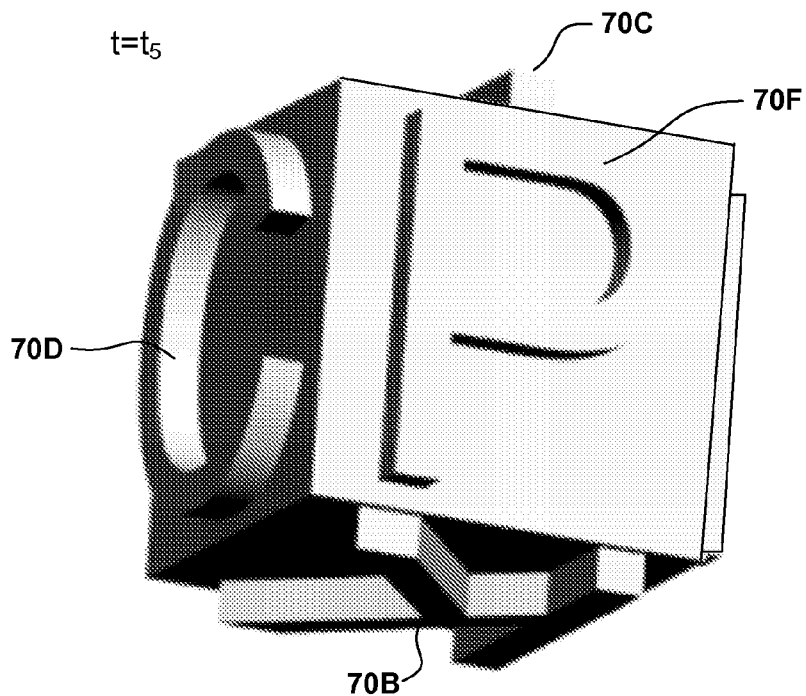
Figure 4F:
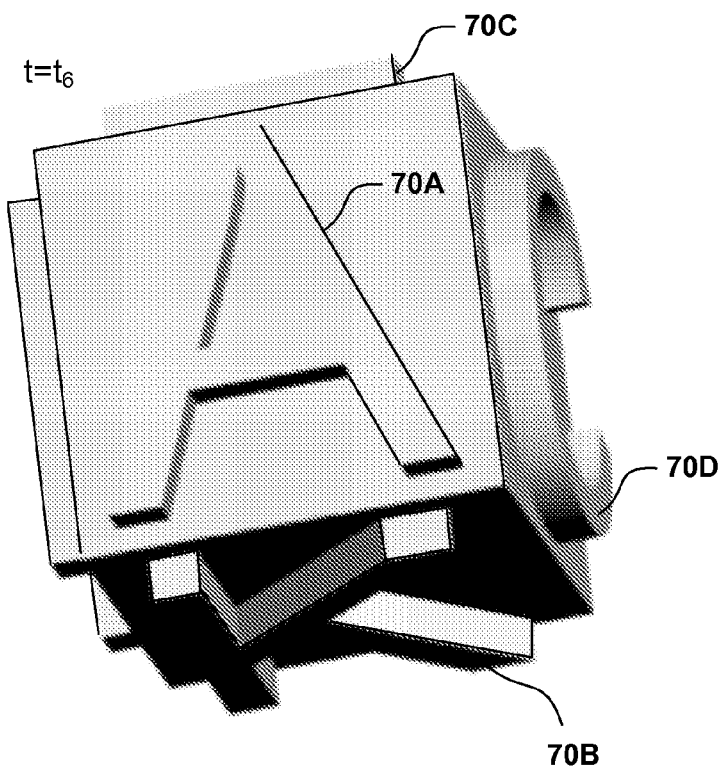
Figure 4G:
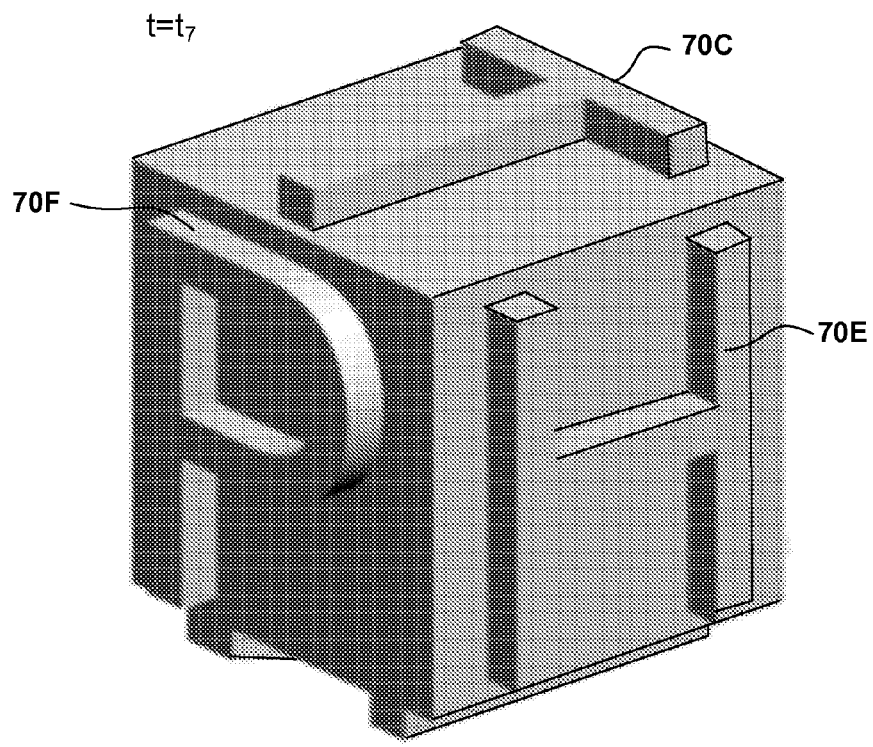
Figure 4H:
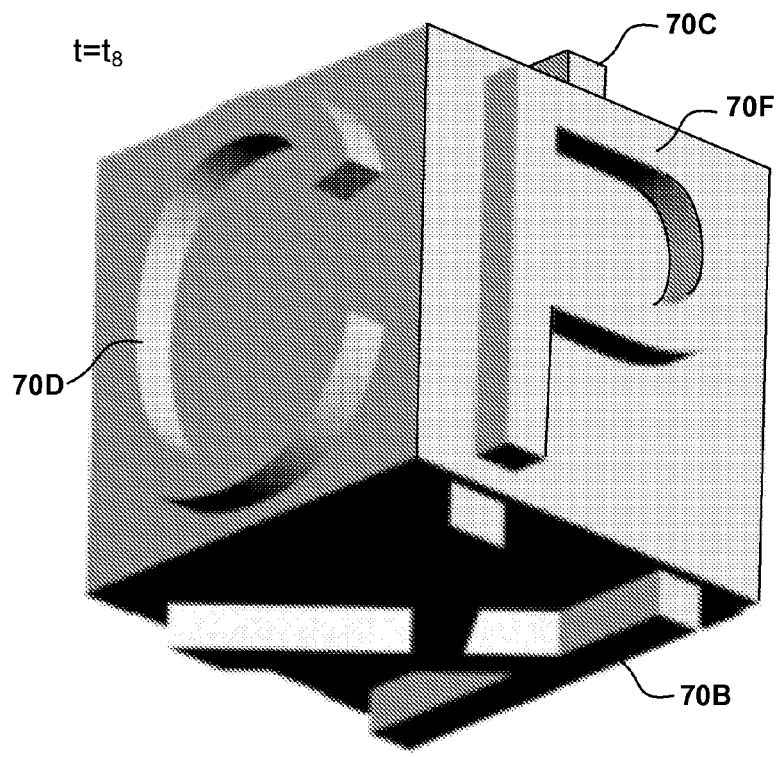
Figure 5A:
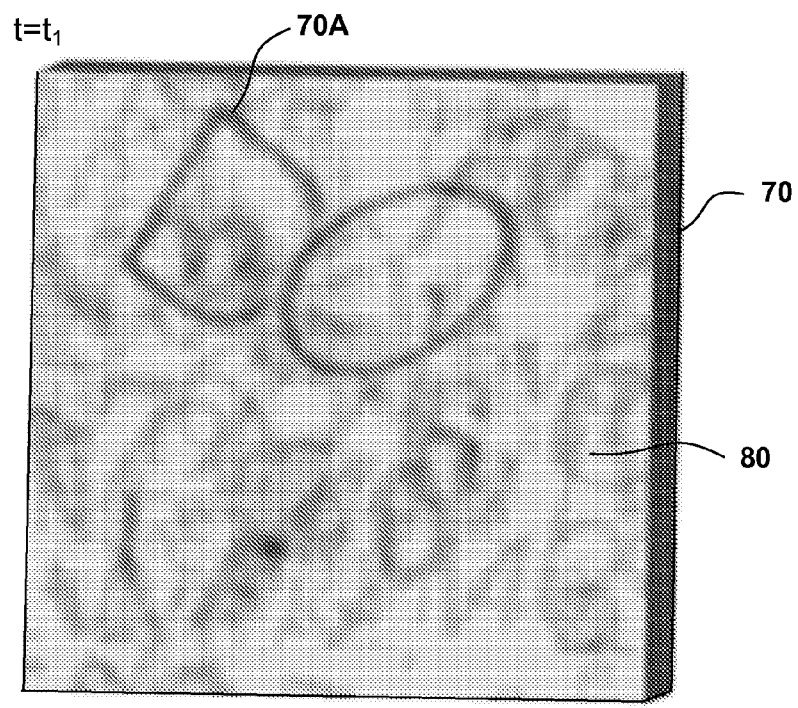
FIGS. 5A-D illustrate a time managed challenge-response test using a geometric shape overlaid with a graphical pattern, in accordance with one embodiment of the present invention.
Figure 5B:
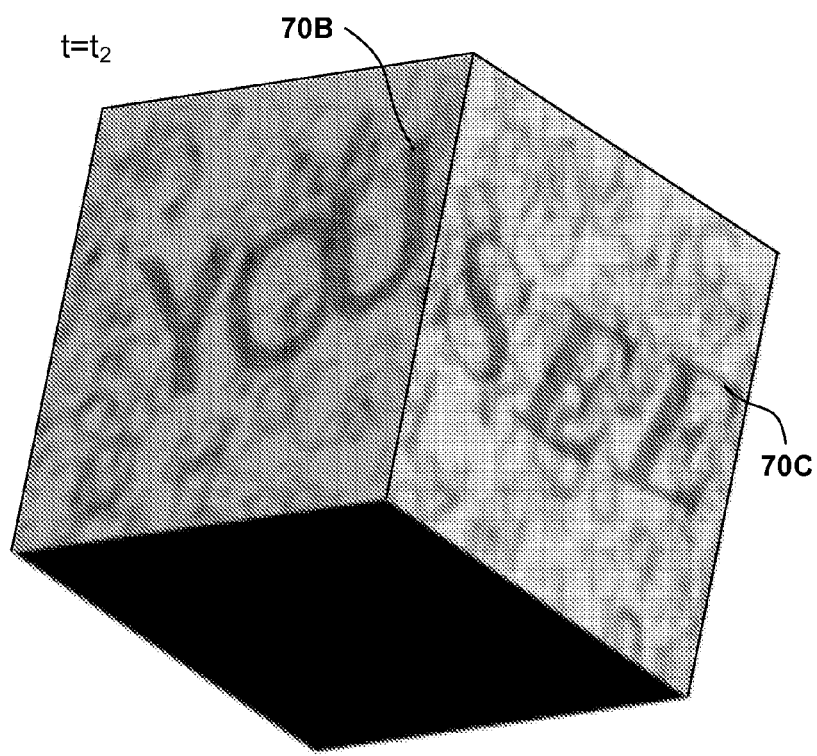
Figure 5C:
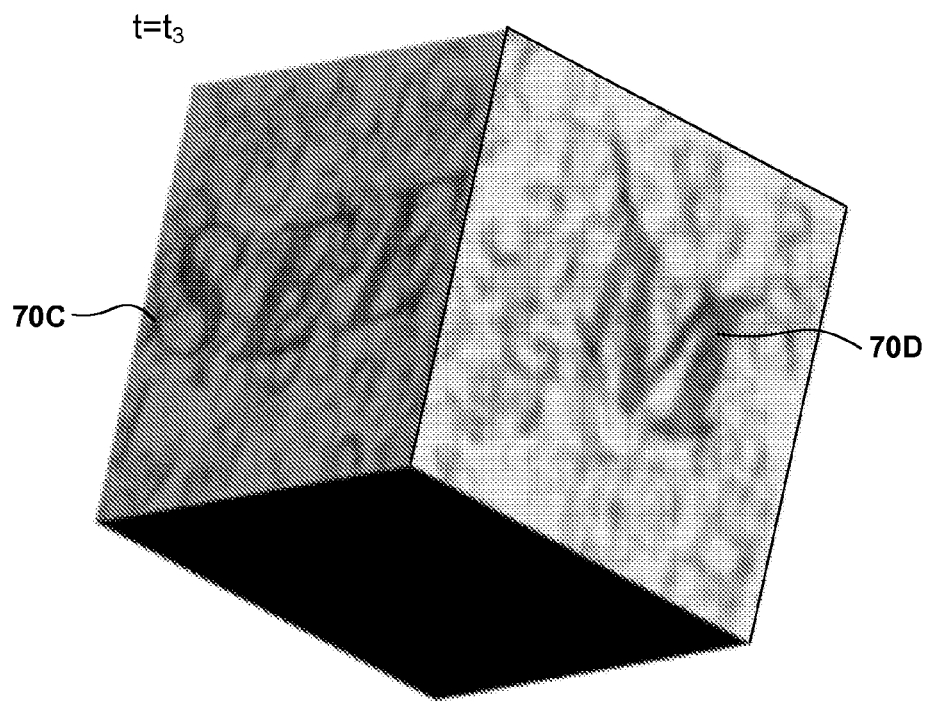
Figure 5D:
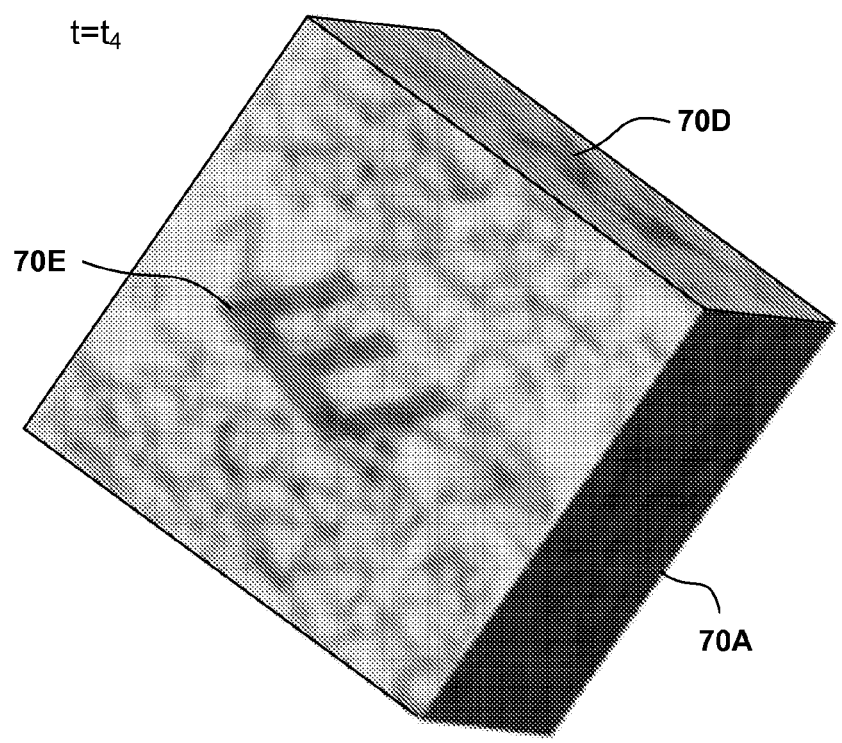

In another embodiment, the movement engine varies the speed, direction, axis of rotation, or any combination of characteristics associated with the geometric shape 70 is randomly varied as a function of time, as illustrated in FIG. 2. One will skill in the art will appreciate random movement increases the difficulty of capturing the entire entry object through automated screen capturing, and varying the axis of rotation reveals different portions of the entry object 70A-F. For example, during time $t_1$ the portion of the entry object 70A can be discerned, while the other portions of the entry object are obscured, as illustrated in FIG. 4A. In another example, during time $t_2$ portions of the entry object 70A, 70B, and 70D are visible, as illustrated in FIG. 4B. As illustrated by FIGS. 4A-H, during times $t_1$-$t_8$, all the portions of the entry object 70A-F are revealed by varying the axis of rotation and rotating the geometric shape 70.

FIGS. 5A-D illustrate a time managed challenge-response test using a geometric shape overlaid with a graphical pattern, in accordance with one embodiment of the present invention. A pattern defined by graphical elements 80 is overlaid onto the surface of the geometric shape 70, in addition to the entry object 70A-E. In one embodiment, the pattern defined by graphical elements has an opacity that serves to partially obscure the entry object 70A-E. As discussed above, the pattern defined by graphical elements is generated by the graphics engine of the server, as illustrated in FIG. 2. In another embodiment, the entry object 70A-E is distributed over different locations on the surface of the geometric shape 70 and may include a sequence of alphanumeric characters. As the axis of rotation is varied, rotating the geometric shape 70 enables different portions of the entry object 70A-E to be visible to the user during times $t_1$-$t_4$, as illustrated in FIGS. 5A-D.

Figure 6A:
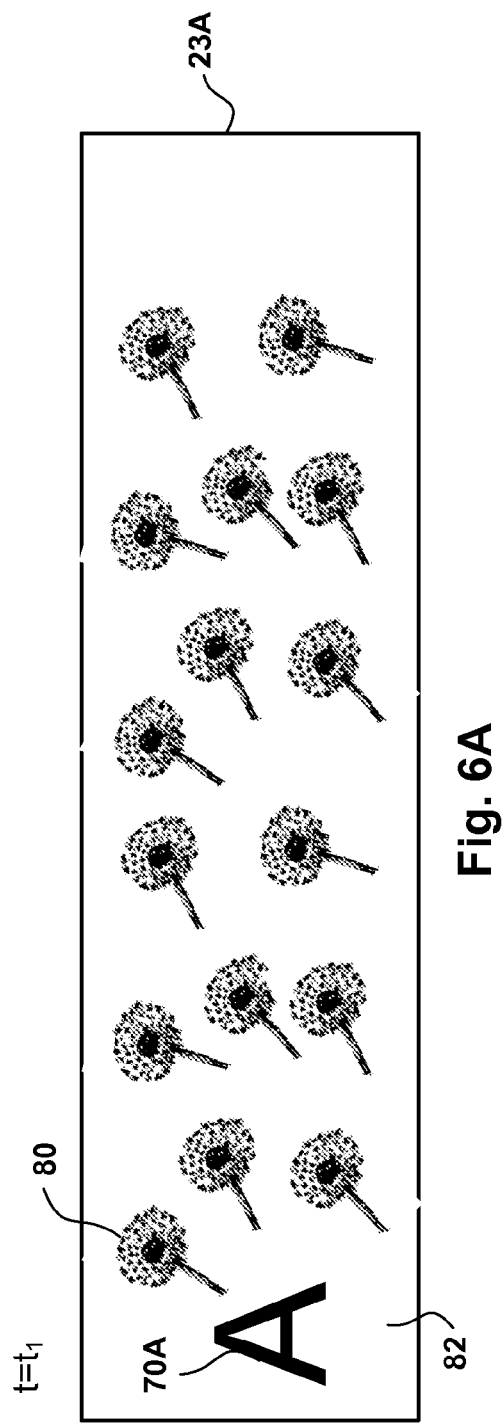
FIGS. 6A-D illustrate a time managed challenge-response test implemented using a graphical pattern overlaid over the entry object, in accordance with one embodiment of the present invention.
Figure 6B:
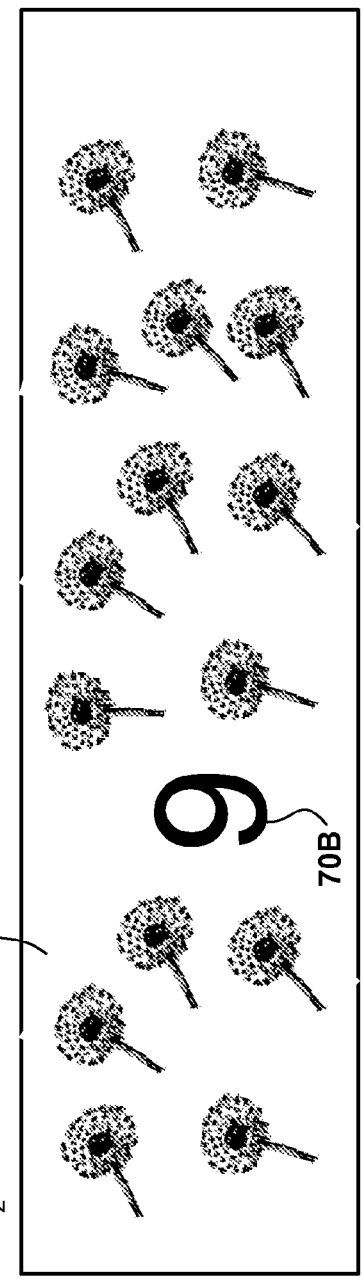
Figure 6C:
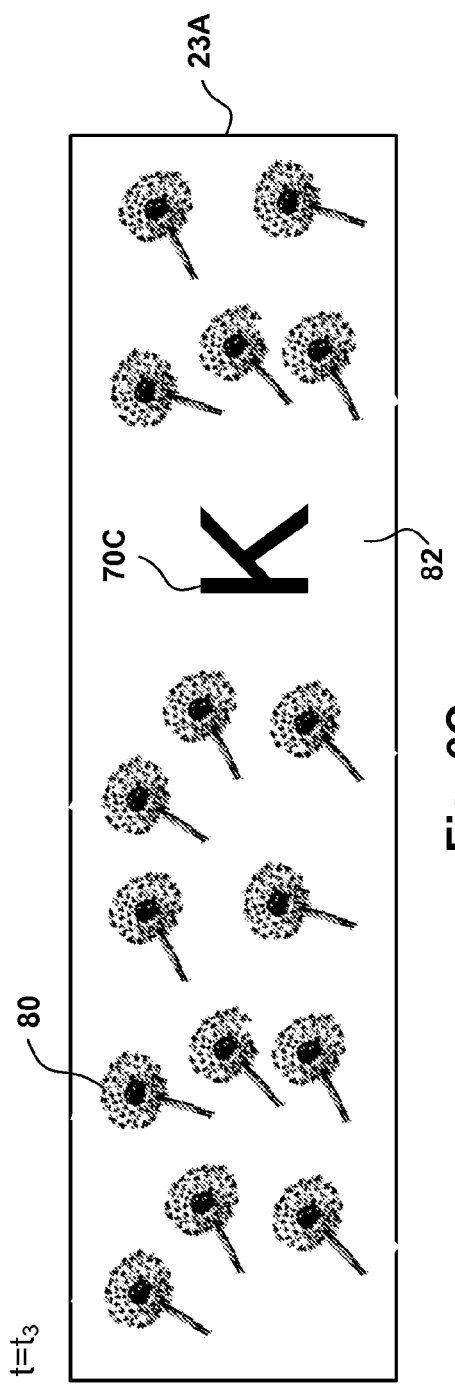
Figure 6D:
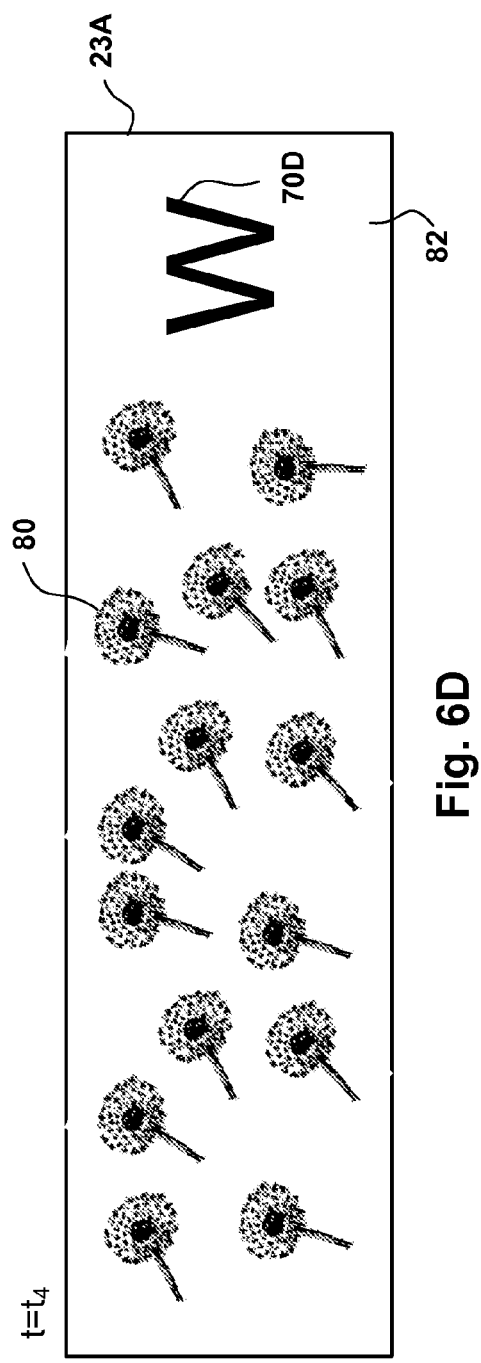
Figure 7A:
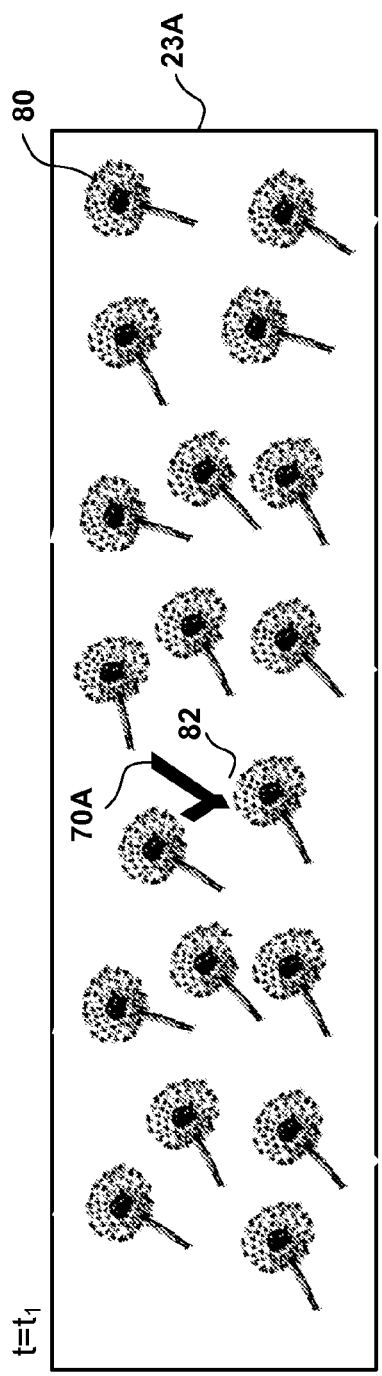
FIGS. 7A-D illustrate a time managed challenge-response test using a graphical pattern to reveal individual alphanumeric characters of the entry object, in accordance with one embodiment of the present invention.
Figure 7B:
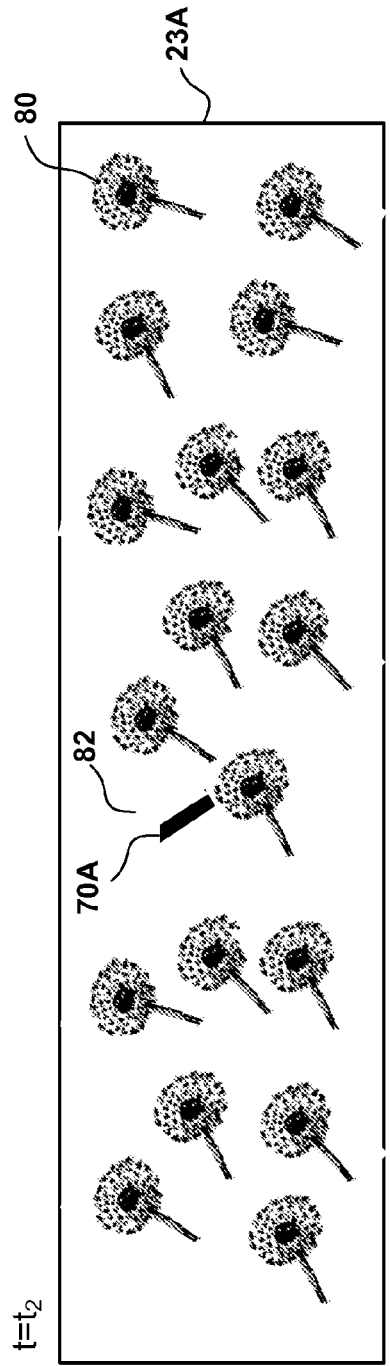
Figure 7C:
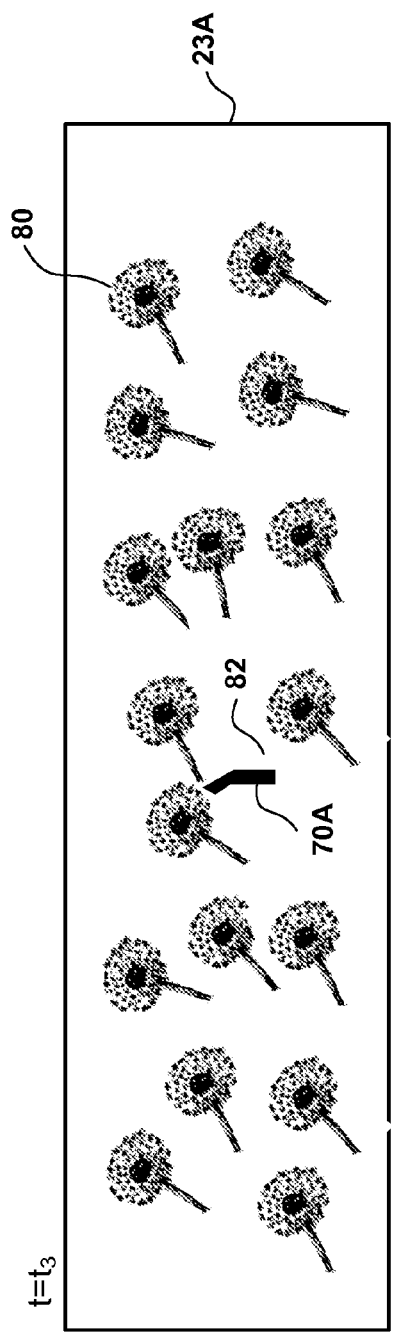
Figure 7D:
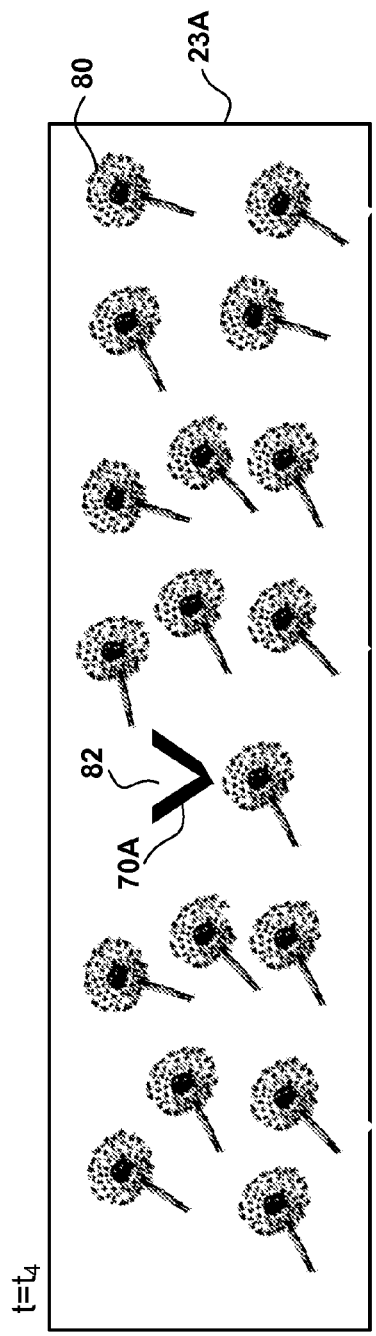

FIGS. 6A-D illustrate a time managed challenge-response test implemented using a graphical pattern overlaid over the entry object, in accordance with one embodiment of the present invention. The entry object 70A-D of the time managed challenge-response test is distributed in the display area 23A. As discussed above, the graphics engine generates a pattern defined by graphical elements 80, which is overlaid over the entry object 70A-D. In one embodiment, the generated pattern defined by graphical elements 80 includes an area free of graphical elements 82. In other words, after the pattern defined by graphic elements 80 is overlaid over the entry object 70A-D, the entry object 70A-D is obscured except for the portion that is within the area free of graphical elements 82. As illustrated in FIG. 6A, at time $t_1$ the portion of the entry object 70A within the area free of graphical elements 82 is visible, while the remaining portions of the entry object are hidden. In one embodiment, the portion of the entry object 70A is an entire alphanumeric character of the entry object. In another embodiment, the movement engine moves the area free of graphical elements 82 along a path traversing across the entry object 70A-D in the display area 23A. Still further, the graphical elements 80 may have movement independent of the movement of the area free of graphical elements 82. In other words, the pattern defined by graphical elements 80 can move along a first direction, while the area free of graphical elements 82 moves along a path in a second direction. During times $t_1$-$t_4$, a different portion of the entry object 70A-D is revealed to the user, as illustrated in FIGS. 6A-D.

FIGS. 7A-D illustrate a time managed challenge-response test using a graphical pattern to reveal individual alphanumeric characters of the entry object, in accordance with one embodiment of the present invention. The pattern defined by graphical elements 80 can be further used to obscure individual alphanumeric characters of the entry object 70A of the time managed challenge-response test. In one embodiment, as described above, the pattern defined by graphical elements 80 has an area free of graphical elements 82. Depending on the size and location of the area free of graphical elements 82, parts of individual alphanumeric characters of the entry object 70A can be revealed to the user over a specified period of time. The area free of graphical elements is moved in such a way as to reveal the entire portion of the entry object 70A over the specified period of time, from $t_1$-$t_4$, as illustrated in FIGS. 7A-D. In another embodiment, the area free of graphical elements 82 moves to a new position on the path when the alphanumeric character of the entry object 70A is entered by the user. One skilled in the art will appreciate that the area free of graphical elements 82 can also be used to simultaneously reveal multiple portions of alphanumeric characters of the entry object 70A.

Figure 8:
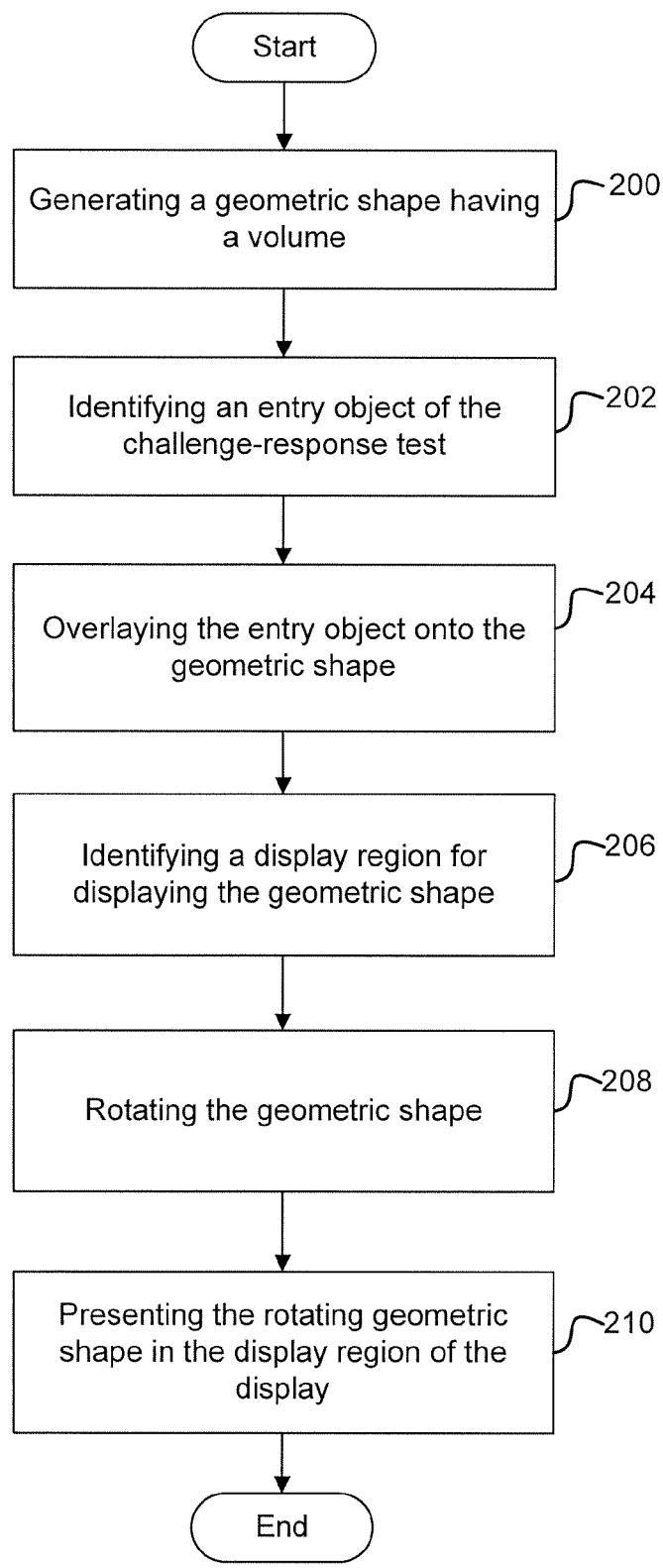
FIG. 8 is a flow chart diagram illustrating method operations for generating a time managed challenge-response test implemented using a geometric shape, in accordance with one embodiment of the present invention.

FIG. 8 is a flow chart diagram illustrating method operations for generating a time managed challenge-response test implemented using a geometric shape, in accordance with one embodiment of the present invention. The method begins in operation 200, where a geometric shape having a volume is identified. In one embodiment, the geometric shape can be a cube, as illustrated in FIGS. 4A-H. In another embodiment, the geometric shape can be a "bubble" or an asymmetrical spherical shape. An entry object of the time managed challenge-response test is generated in operation 202. In one embodiment, the entry object is made up of a sequence of alphanumeric characters generated by the test generation engine, as illustrated in FIG. 2.

The method advances to operation 204, where the entry object generated in operation 202 is overlaid onto the surface of the geometric shape. In one embodiment, the overlay engine overlays the entry object onto the geometric shape identified by the graphics engine, as illustrated in FIG. 2. In another embodiment, the entry object is overlaid and embossed on the geometric shape as a protrusion on the surface of the geometric shape, as illustrated in FIGS. 3A-F. Operation 206 identifies a display region for displaying the geometric shape overlaid with the entry object of the challenge-response test. In one embodiment, the display region has an associated response area in which the user provides the solution to the challenge-response test, i.e., the sequence of alphanumeric characters of the entry object, as illustrated in FIG. 1B. In another embodiment, the geometric shape is shaded to obscure the entry object during straight on viewing. In operation 208, the geometric shape overlaid with the entry object is rotated in the display area. Still further, as illustrated in FIG. 2, the speed, axis of rotation, or direction is randomly varied by the movement engine, in one embodiment. The rotating geometric shape is presented in the display region of the display of the client system in operation 210, as illustrated in FIG. 1A. In one embodiment, user input is requested for each revealed portion of the entry object and the requested user input is compared with the entry object. In another embodiment, rotation of the geometric shape of operation 208 is in response to user input.

Figure 9:
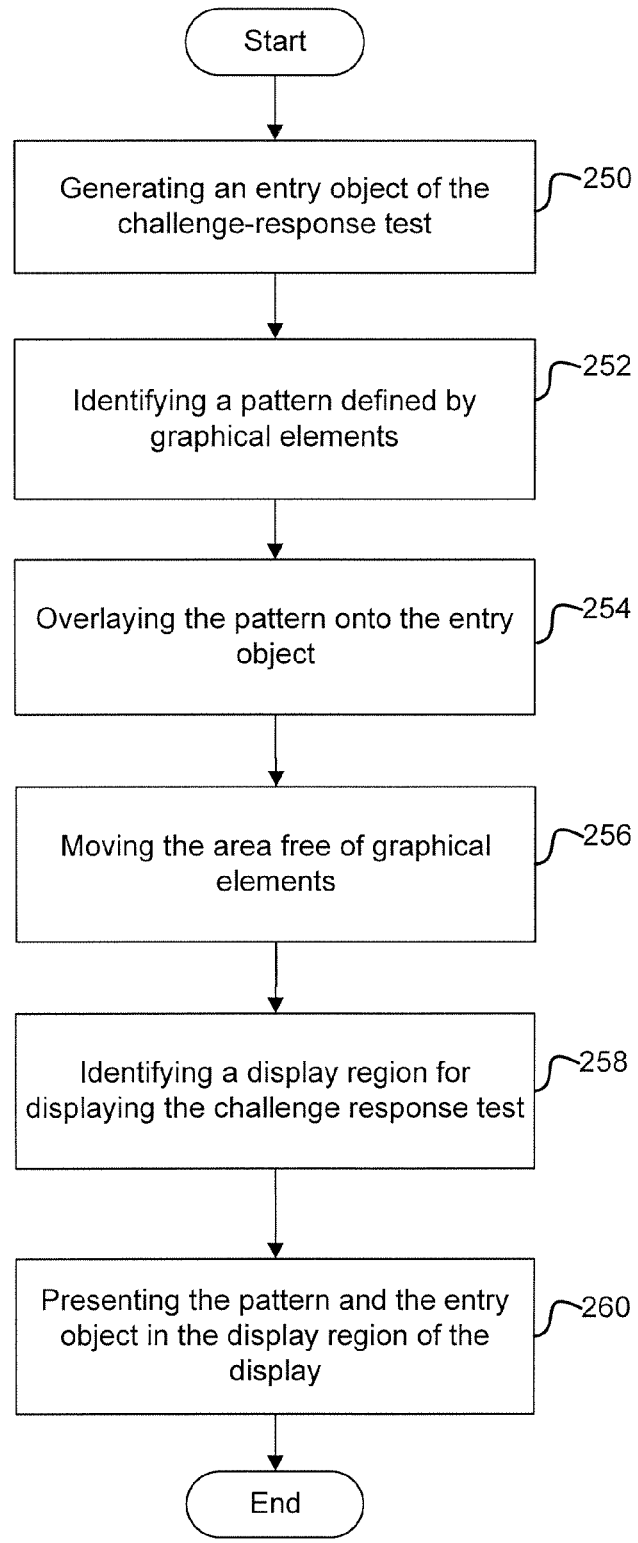
FIG. 9 is a flow chart diagram illustrating method operations for generating a time managed challenge-response test overlaid with a pattern defined by graphical elements, in accordance with one embodiment of the present invention.

FIG. 9 is a flow chart diagram illustrating method operations for generating a time managed challenge-response test overlaid with a pattern defined by graphical elements, in accordance with one embodiment of the present invention. The method begins in operation 250, where an entry object of the time managed challenge-response test is generated. In one embodiment, the entry object is generated by the test generation engine, as illustrated in FIG. 2. In operation 252, a pattern defined by graphical elements is identified. In one embodiment, the pattern defined by graphical elements can depict a scene such as wind blowing sand or leaves across the display area of the challenge-response test. In another embodiment, the pattern defined by graphical elements has an area free of graphical elements, as illustrated in FIGS. 7A-D.

The method advances to operation 254, where the pattern defined by graphical elements identified in operation 252 is overlaid over the entry object of the challenge-response test. As illustrated in FIGS. 7A-D, overlaying the pattern defined by the graphical elements obscures the entry object from the user. In one embodiment, the area free of graphical elements reveals a portion of the entry object of the challenge-response test. The method advances to operation 256, where the area of the pattern free of graphical elements is moved along a path traversing across the entry object. As discussed above, the movement of the area of the pattern free from graphical elements reveals different portions of the entry object as the area moves along the path. In one embodiment, the area of the pattern free of graphical elements moves at a randomly varying speed. One with skill in the art will appreciate the time the area of the pattern free of graphical elements takes to completely traverses across the entry object determines a minimum time needed to solve the time managed challenge-response test. In operation 258, a display region for displaying the challenge-response test is identified. As illustrated in FIG. 2, the display region is on the display of a client system. The entry object and the pattern defined by graphical elements are presented in the display region in operation 260. In one embodiment, user input is requested for each revealed portion of the entry object and the requested user input is compared with the entry object. In another embodiment, the user input is provided in the response area of the authentication webpage, as illustrated in FIG. 1B.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
   identifying a geometric shape having a volume;
   generating an entry object;
   overlaying the entry object onto the geometric shape, the overlaying is distributed over a graphical surface of the geometric shape,
   wherein the entry object includes a sequence of alphanumeric characters, wherein a first one of the alphanumeric characters is overlaid on a first face of the geometric shape and a second one of the alphanumeric characters is overlaid on a second face of the geometric shape;
   identifying a display region on a display of a client device for rendering the geometric shape;
   receiving user input identifying a first portion of the entry object; and
   rotating the geometric shape and the entry object automatically in response to receiving the user input identifying the first portion, the rotating revealing a second portion of the entry object that is hidden,
   wherein the method is executed by a processor of a server.

2. The method of claim 1, further comprising:
   randomly varying one of a speed, direction, and axis of rotation of the geometric shape.

3. The method of claim 1, further comprising:
   shading the geometric shape to obscure the first portion of the entry object on the graphical surface of the geometric shape.

4. The method of claim 1, further comprising:
   requesting the user input for the first portion of the entry object; and
   comparing the user input with the entry object.

5. The method of claim 1, further comprising:
   overlaying a pattern defined by graphical elements on the entry object, such that the pattern defined by the graphical elements obscures the entry object.

6. The method of claim 1, further comprising:
   embossing the entry object as a protrusion on the graphical surface of the geometric shape, such that the protrusion is visible when viewed at an angle.

7. The method of claim 6, wherein the protrusion is hidden during straight on viewing.

8. The method of claim 1, further comprising:
   overlaying a pattern defined by graphical elements onto the graphical surface of the geometric shape.

9. A computing system comprising:
   a server including a processor, the processor including,
   a test generation engine for generating an entry object;
   a graphics engine identifying a geometric shape having a volume;
   an overlay engine for overlaying a first portion of the entry object on a graphical surface of the geometric shape, the overlaying distributes the entry object over the geometric shape,
   wherein the entry object includes a sequence of alphanumeric characters, wherein a first one of the alphanumeric characters is for overlaying on a first face of the geometric shape and a second one of the alphanumeric characters is for overlaying on a second face of the geometric shape; and
   a movement engine for rotating the geometric shape and the entry object automatically in response to a user input identifying the first portion, the rotating revealing a second portion of the entry object that is hidden,
   wherein the geometric shape is displayed on a display device of a client device; and
   one or more memory devices coupled to the processor, the one or more memory devices for storing the test generation engine, the graphics engine, the overlay engine, and the movement engine.

10. The computing system of claim 9, wherein the graphics engine generates a pattern defined by graphical elements, wherein the overlay engine overlays the pattern defined by the graphical elements onto the graphical surface of the geometric shape.

11. The computing system of claim 9, wherein the overlay engine embosses the first portion of the entry object as a protrusion on the graphical surface of the geometric shape.

12. The computing system of claim 9, wherein the movement engine randomly varies one of a speed, direction, and axis of rotation of the geometric shape.

13. The computing system of claim 9, wherein the test generation engine requests the user input for the first portion of the entry object and compares the user input with the entry object.

14. A method comprising:
   generating an entry object;
   identifying a pattern defined by graphical elements, the pattern having an area free of graphical elements;
   overlaying the pattern defined by graphical elements onto the entry object;
   enabling automatic movement, in a two-dimensional plane, of the area free of graphical elements along a path traversing across the entry object;
   identifying a display region on a display of a client device for rendering the entry object, such that a portion of the entry object is visible at any point in time by the area free of graphical elements; and
   providing the pattern and entry object for display in the display region of the display, such that a portion of the entry object is discernable at a point in time through the area free of graphical elements, wherein the entry object includes a sequence of alphanumeric characters, wherein a first one of the alphanumeric characters is provided for being visible in a first portion of the area free of graphical elements and a second one of the alphanumeric characters is provided for being visible in a second portion of the area free of graphical elements, wherein the method is executed by a processor of a server.

15. The method of claim 14, further comprising:
   requesting user input for each revealed portion of the entry object; and
   comparing the requested user input with the entry object.

16. The method of claim 14, further comprising randomly varying a speed of movement of the area free of graphical elements.

17. The method of claim 14, further comprising:
   determining a minimum time to solve a time managed challenge-response test through a speed of movement of the area free of graphical elements.

18. The method of claim 14, further comprising:
   enabling movement of the graphical elements defining the pattern within the display region.

19. The method of claim 14, wherein the graphical elements defining the pattern move independently from movement of the area free of graphical elements.

* * * * *